United States Patent [19]

Gamo et al.

[11] Patent Number: 4,523,073

[45] Date of Patent: Jun. 11, 1985

[54] WIRE-CUT ELECTRIC DISCHARGE MACHINE CONTROLLER FOR COMPENSATING THE MACHINING CORNERING PARAMETERS

[75] Inventors: Gotaro Gamo; Mitsuo Kinoshita, both of Hachioji; Haruki Obara, Sagamihara, all of Japan

[73] Assignee: Fanuc Ltd, Minamitsuru, Japan

[21] Appl. No.: 413,383

[22] PCT Filed: Dec. 28, 1981

[86] PCT No.: PCT/JP81/00421

§ 371 Date: Aug. 25, 1982

§ 102(e) Date: Aug. 25, 1982

[87] PCT Pub. No.: WO82/02355

PCT Pub. Date: Jul. 22, 1982

[30] Foreign Application Priority Data

Dec. 30, 1980 [JP] Japan ................. 55-186736

[51] Int. Cl.³ .............................. B23P 1/08
[52] U.S. Cl. ..................... 219/69 W; 219/69 M
[58] Field of Search ............... 219/69 M, 69 S, 69 W, 219/69 G, 68

[56] References Cited

U.S. PATENT DOCUMENTS

| 4,081,652 | 3/1978 | Janicke et al. | 219/69 W |
| 4,232,208 | 11/1980 | Buhler | 219/69 W |
| 4,366,359 | 12/1982 | Yatomi et al. | 219/69 W |

FOREIGN PATENT DOCUMENTS 0013096  1/1979  Japan ................. 219/69 W

OTHER PUBLICATIONS

JP, A, 55-106732 (Inoue Japax Research Inc.) 15, Aug., 1980 (15.08.80), col. 1, lines 5 to 12 (with English Translation).

JP, A, 55-125939 (Mitsubishi Electric Corp.) 29, Sep., 1980 (29.09.800), col. 1, lines 5 to 14, col. 2, lines 10 to 14 (with English Translation).

*Primary Examiner*—M. H. Paschall
*Attorney, Agent, or Firm*—Staas & Halsey

[57] ABSTRACT

A cutting control method for reducing cutting errors at a corner due to flexing of a wire electrode in a wire-cut electric discharge machine in which a voltage is applied between the wire electrode and a workpiece to cut the latter with electric discharge energy while moving the workpiece relatively to the wire electrode based on cutting command data for cutting the workpiece to a predetermined shape. An amount of override (K) is determined by an override arithmetic unit (103b) using data (r) on the radius of curvature of a corner angle (θ) data which are given as the cutting command data from a paper tape (101). A relative speed (F) is derived by a relative speed arithmetic unit (103f) from the amount of override (K) and a commanded feeding speed (F₀). Motors (MX, MY) are rotated by pulse distributors (105X, 105Y) and servo circuits (SVX, SVY), respectively, based on the relative speed (F) which is lower than the commanded feeding speed (F₀) to move the workpiece with respect to the wire electrode for electric discharge cutting of the corner.

3 Claims, 8 Drawing Figures (a)   (b)

WIRE-CUT ELECTRIC DISCHARGE MACHINE CONTROLLER FOR COMPENSATING THE MACHINING CORNERING PARAMETERS

BACKGROUND OF THE INVENTION

The present invention relates to a method of controlling a wire-cut electric discharge machine to prevent cutting errors which would be produced upon flexing of a wire electrode when a corner is cut during an electric discharge cutting operation, and more particularly to a simple method of controlling a wire-cut electric discharge machine to cut an accurate corner.

Wire-cut electric discharge machines operate on the principle that a voltage is applied across a gap between a wire electrode and a workpiece to generate a spark discharge across the gap for cutting the workpiece with the spark energy. The workpiece can be cut to a desired contour by moving the workpiece with respect to the wire electrode based on cutting command data.

More specifically, as schematically shown in FIG. 1, which shows a known wire-cut electric discharge machine, a wire 1 is reeled out of a reel $RL_1$, extends between a lower guide 4 and an upper guide 4, and is wound around a reel $RL_2$. A voltage is applied by a contact electrode (not shown) to the wire to generate a discharge between the wire 1 and the workpiece 2 for cutting the workpiece. The workpiece 2 is fastened to a table TB movable by motors MX and MY in the X and Y directions, respectively. Thus, the workpiece 2 can be cut to a desired configuration by moving the table TB in the X and Y directions. The upper guide 4 is attached to a moving mechanism MMC movable by motors MU and MV in the X and Y directions respectively so that the upper guide 4 is movable in the X and Y directions. The moving mechanism, the reels $RL_1$ and $RL_2$ and the lower guide 4 are mounted on a column CM.

A numerical control unit NC serves to read the contents of a command tape TP, and has a distributor circuit DS for distributing commands for respective axes and drive circuits SVX, SVY, SVU and SVV for the corresponding axes for energizing the motors MX, MY, MU and MV respectively to move the table TB and the moving mechanism until the workpiece 2 is cut to a desired shape.

FIG. 2 illustrates of a cutting operation of such an electric discharge cutting machine. When the wire electrode 1 moves in and along a slot 3 in a given direction while cutting the workpiece 2 with electric discharge, a pressure is developed between the wire electrode 1 and the workpiece due to the electric discharge and pushes back the wire electrode 1 in the direction of the arrow which is opposite to the direction in which the electrode 1 moves along, as shown in the cross-sectional view of FIG. 3. The wire electrode 1 is therefore backed off or flexes from the position of the wire guides 4. The cutting accuracy is not affected to an appreciable extent by the amount of such flexing as long as the wire electrode 1 cuts the workpiece 2 along a rectilinear slot. However, the amount of flexing causes a serious problem when the wire electrode 1 cuts the workpiece to form a corner. Thus, as shown in FIG. 4, which is a plan view of a cut slot, a slot 3 is composed of a first rectilinear slot L1 and a second rectilinear slot L2 extending perpendicularly to the first rectilinear slot L1, and defining such a combined slot 3 which requires a corner CN to be cut at the junction between the first and second rectilinear slots L1 and L2. To this end, the workpiece 2 and the wire electrode 1 are caused to move relatively in one direction to form the first rectilinear slot L1, and thereafter the direction of such relative movement needs to be changed at a right angle under a cutting command to form the second rectilinear slot L2. The wire electrode 1 however has a tendency to be dragged inwardly of the corner CN due to the flexing of the wire electrode 1 at a position in which the electric discharge takes place, with the result that the contour of the slot 3 as it is cut is distorted considerably inwardly and becomes blunt as shown by the dotted lines, a configuration which is different from a commanded shape (shown by the solid lines).

FIG. 5 is a plan view of an arcuate corner CN' to be formed between the first and second rectilinear slots L1 and L2. In cutting such an arcuate corner CN', the fixing of the wire electrode 1 due to the electric discharge causes the corner CN' to be cut along a path shown by the dotted lines which is duller than a commanded shape as illustrated by the solid lines.

It is known that the cutting errors at such arcuate and angular corners can be reduced by changing the path of cutting, the cutting power supply, the speed of feed, and other factors. However, there are a great many combinations available for such cutting conditions, and the customary practice is complex and impractical as no specific standard is established for controlling the cutting path, the feeding speed, and the cutting power supply voltage.

SUMMARY OF THE INVENTION

Accordingly, it is an object of the present invention to provide a simple method of controlling a wire-cut electric discharge machine to improve blunt corner shapes.

Another object of the present invention is to provide a method of controlling a wire-cut electric discharge machine for improving blunt corner shapes and accurately cutting corners simply by changing the feeding speed.

Still another object of the present invention is to provide a method of controlling a wire-cut electric discharge machine to minimize the amount of flexing of the wire electrode at a corner being cut, for an increased cutting accuracy, by changing a commanded feeding speed dependent on radius of curvature data of the corner, corner angle data, and thickness data of the workpiece.

With the present invention, a relative speed of movement between a workpiece and a wire electrode is determined using radius of curvature data of a corner, a corner angle data, and a commanded feeding speed data, which are given as cutting command data for cutting the corner. The workpiece is moved relatively with respect to the wire electrode at such a determined relative speed for electric discharge cutting of the workpiece. The determined relative speed is moderately lower than the commanded feeding speed for reducing the amount of flexing of the wire electrode to accurately cut the corner of the workpiece.

Furthermore, not only the radius of curvature data of the corner, the corner angle data, and the commanded feeding speed data, but also the thickness of the workpiece, are utilized to calculate the relative speed of movement between the workpiece and the wire electrode for moving the workpiece with respect to the wire electrode at such a relative speed as to effect electric discharge cutting of the workpiece. Accordingly, highly accurate electric discharge cutting of the corner can be performed no matter how thick the workpiece may be.

DESCRIPTION OF THE PREFERRED EMBODIMENT

The present invention will now be described in more detail with reference to the drawings.

Figure 1:
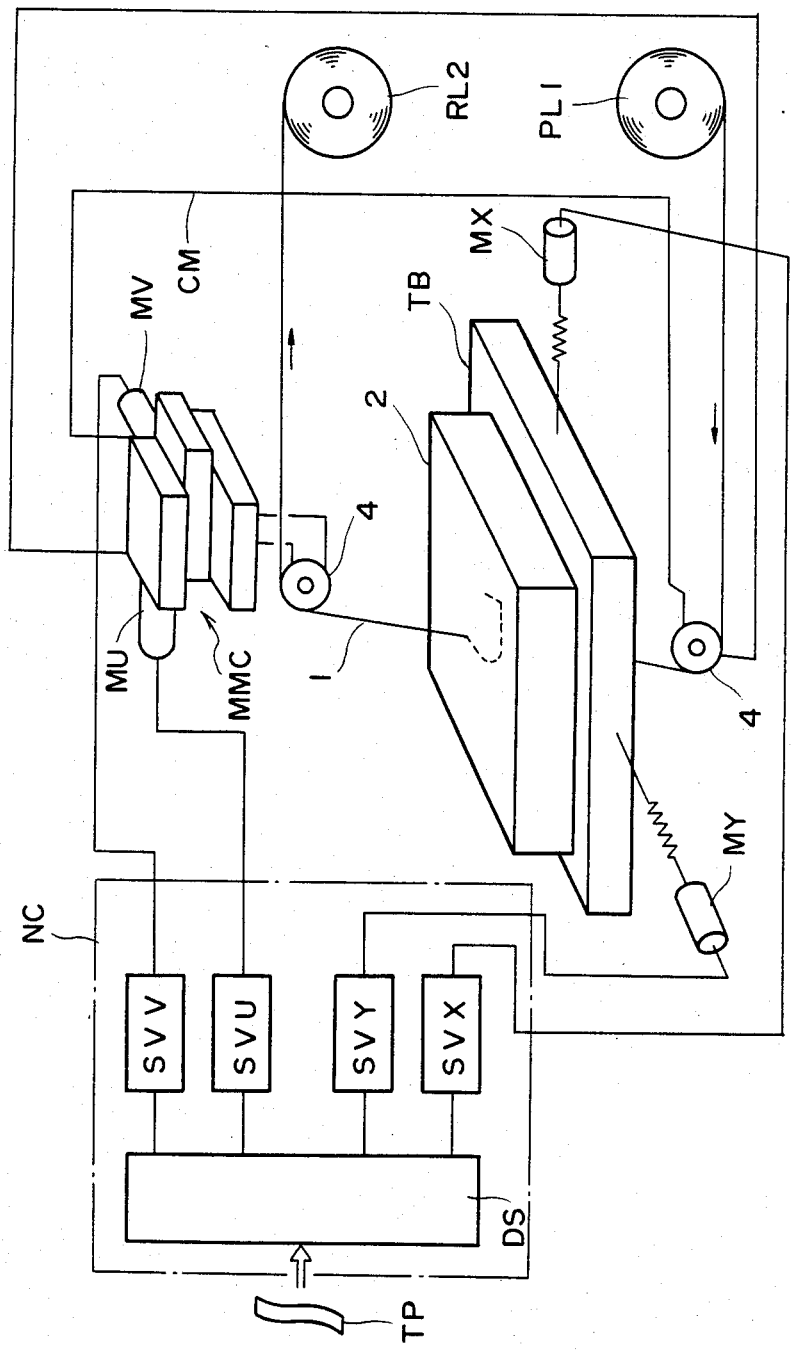
FIG. 1 is a schematic view of a wire-cut electric discharge machine.
Figure 2:
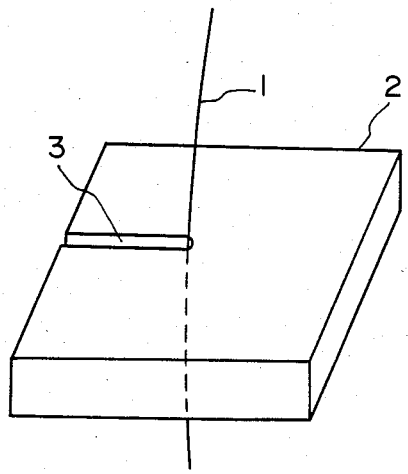
FIG. 2 is a perspective view of the principle on which a workpiece is cut by a wire due to electric discharge.
Figure 3:
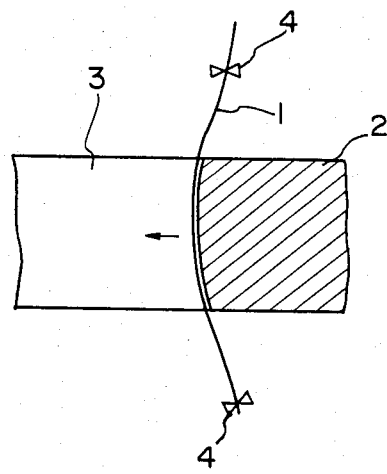
FIG. 3 is a cross-sectional view of flexing of the wire electrode.
Figure 4:
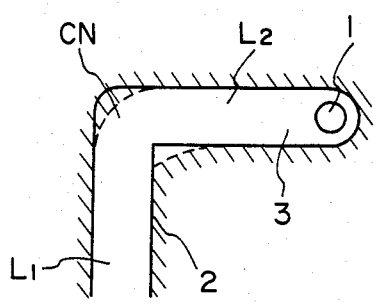
FIGS. 4 and 5 are plan views of problems with a conventional electric discharge cutting process.
Figure 5:
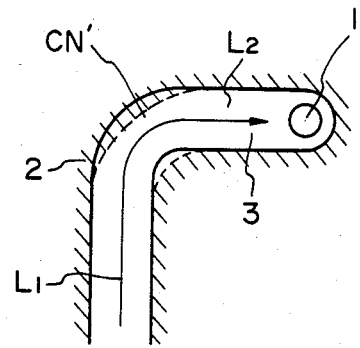
Figure 6:
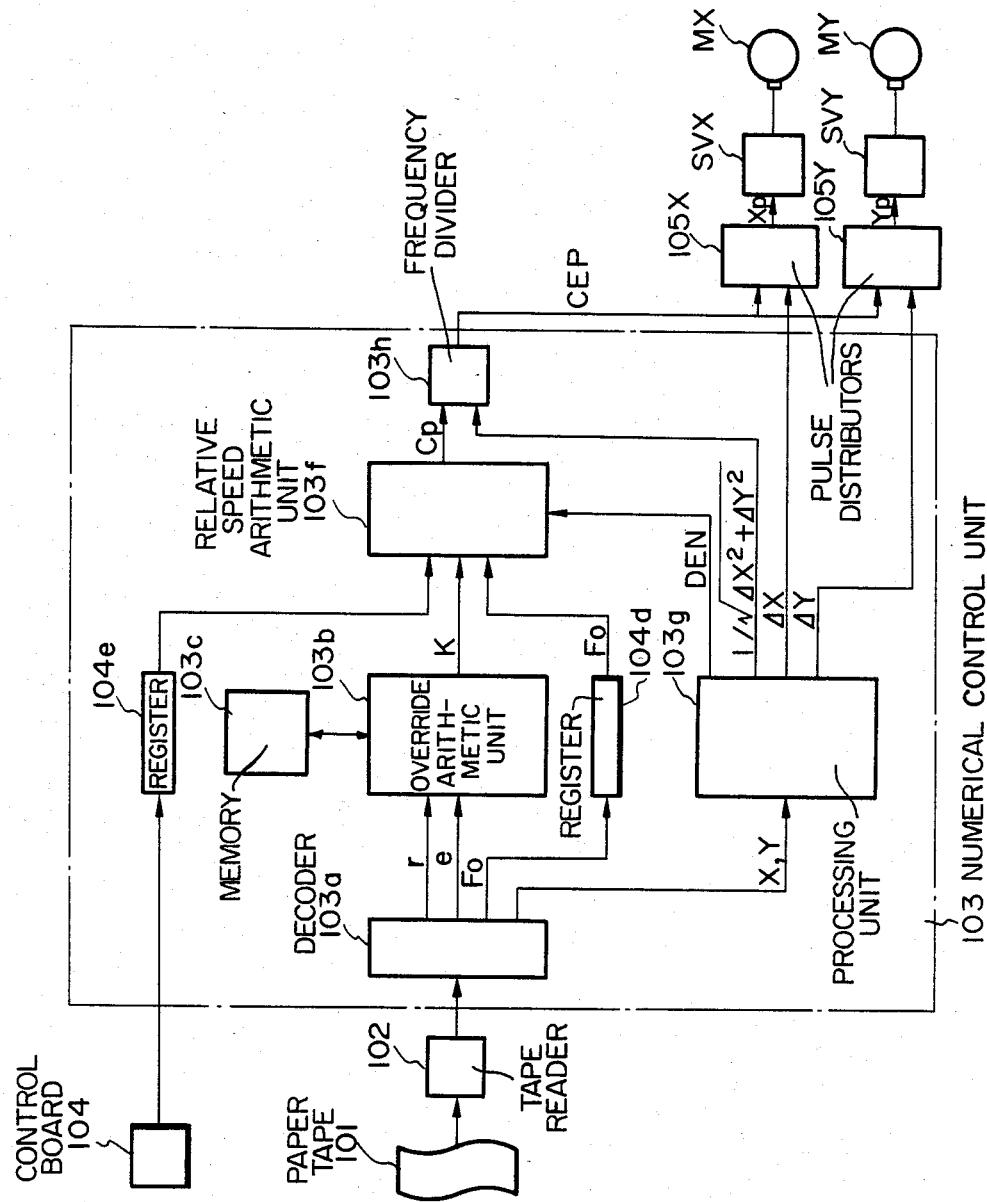
FIG. 6 is a block diagram of an arrangement for effecting a method according to the present invention.
Figure 7:
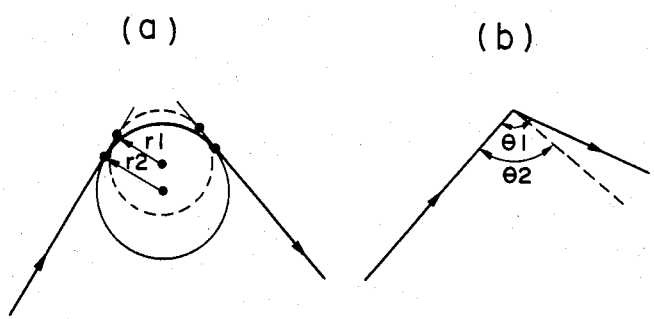
FIG. 7 is a diagram showing corner shapes.
Figure 8:
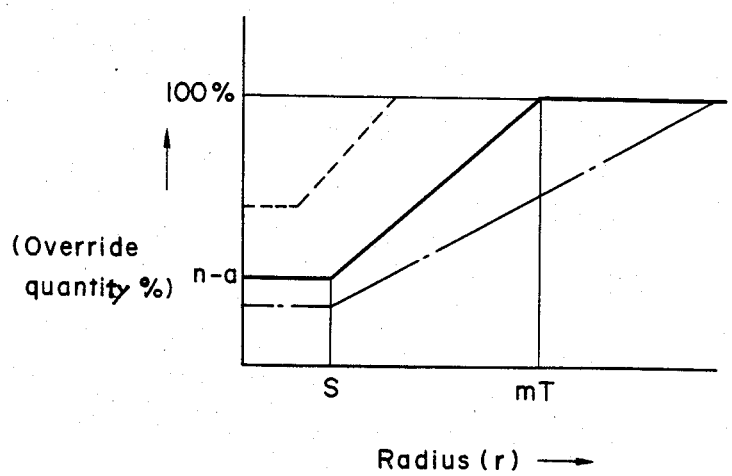
FIG. 8 is a graph of relative speeds between a workpiece and a wire electrode at a corner being cut.

FIG. 6 is a block diagram of an arrangement for effecting a method according to the present invention, FIG. 7 is a diagram of corner shapes, and FIG. 8 is a graph of the relative speeds between a workpiece and a wire electrode at a corner being cut.

Designated in FIG. 6 at 101 is a paper tape in which a cutting program (NC data) is punched, and 102 is a tape reader. The NC program contains numerical data (positional command data and path command data) for determining a desired shape to be cut, M function instruction data, G function instruction data, radius of curvature data of a corner to be cut, corner angle data, and commanded feeding speed data. A numerical control unit 103 comprises a decoder 103a for decoding the NC data read from the paper tape 101 by the tape reader 102, an override arithmetic unit 103b for calculating an amount of override K (%) to override the commanded feeding speed based of the data r on the radius of curvature of the corner, the corner angle data, and various parameters (described later on), a memory 103c for storing the parameters, and a register 104d for storing the commanded feeding speed $F_O$. The numerical control unit 103 also includes a relative speed arithmetic unit 103f for calculating a relative speed of movement F between a workpiece and a wire electrode from the command feeding speed $F_O$, the thickness t of the workpiece, and the amount of override K based on the following equation:

$$F = t \frac{K}{100} F_0 \quad (1)$$

The numerical control unit also generates a train of pulses CP having the relative speed F. When numerical data X and Y is read out of the paper tape 101, a processing unit 103g calculates and supplies increments $\Delta X$ and $\Delta Y$ to pulse distributors in a succeeding stage, and generates an output of $1/\sqrt{\Delta X^2 + \Delta Y^2}$. A frequency divider 103h serves to frequency-divide the pulse train CP having the pulse speed F from the relative speed arithmetic unit 103f into pulses having a frequency of $1/\sqrt{\Delta X^2 + \Delta Y^2}$. The processing unit 103g serves to store in its memory the increments $\Delta X$ and $\Delta Y$ as re- maining amounts of movement Xr and Yr for one block, and carries out the arithmetic operations:

$$Xr - 1 \rightarrow Xr \text{ and } Yr - 1 \rightarrow Yr \quad (2)$$

The processing unit 103g also monitors the remaining amounts of movement each time the pulse distributors generate a single pulse Xp and Yp, internally produces a pulse-distribution completion signal DEN when $Xr=0$ and $Yr=0$ to stop generation of the pulse train CP, and enables the tape reader 102 to read a movement command for a next block from the paper tape 101. A control board 104 sets the maximum thickness of the workpiece at "1". Pulse distributors 105X and 105Y are in the form of digital differential analyzers (DDA) respectively of X and Y axes. Although not shown, the pulse distributors. 105X and, 105Y have registers for storing the increments $\Delta X$ and $\Delta Y$ as settings, accumulators, and adders for adding the increments $\Delta X$ and $\Delta Y$ set in the registers to the contents of the accumulators each time the frequency divider 110 generates a pulse CEP. The accumulators in the pulse distributors 105X and 105Y produce overflow pulses which are distributed as the pulses Xp and Yp to servo circuits SVX and SVY for the corresponding axes to drive the X-axis and Y-axis motors MX and MY, respectively, for thereby moving the wire electrode with respect to the workpiece along a commanded cutting path. Speeds $F_X$ and $F_Y$ of the distributed pulses Xp and Yp are expressed respectively as:

$$F_X = \frac{F \cdot \Delta X}{\sqrt{\Delta X^2 + \Delta Y^2}} \quad (3)$$

$$F_Y = \frac{F \cdot \Delta Y}{\sqrt{\Delta X^2 + \Delta Y^2}}$$

Therefore, the relative speed of movement between the wire electrode and the workpiece is given by $\sqrt{F_X^2 + F_Y^2} F$, which precisely conforms to the relative speed F as it is calculated by the relative speed arithmetic unit 103f.

Operation of the arrangement shown in FIG. 6 will now be described. The thickness t data of the workpiece is supplied as an input through the control board 104 into the register 104e. Then, a start pushbutton (not shown) is depressed to enable the tape reader 102 to read the NC data from the paper tape 101 and feed the same into the numerical control unit 103. The NC data read from the tape 101 is delivered to the decoder 103a in which the data is decoded. The decoder 103a supplies data on the radius of curvature r of a corner and corner angle data $\theta$ to the override arithmetic unit 103b, supplies data on a commanded feeding speed $F_0$ to the register 104d, and supplies numerical data X and Y to the processing unit 103g.

The override arithmetic unit 103b first reads parameters m and n, dependent on the magnitude of the corner angle data $\theta$ from the parameter memory 103c. The n and m having the following values:

$\theta \leq 45°$    $n = p_1$   $m = q_1$ $45° < \theta < 90°$    $n = 1$   $m = 1$ $90° \leq \theta < 120°$   $n = p_2$   $m = q_2$ $\theta \geq 120°$   $K = 100$.

The values $p_1$, $q_1$, $p_2$ and $q_2$ are experimentally determined and stored in the parameter memory 103c in advance.

The override arithmetic unit 103b effects an arithmetic operation based on the radius of curvature data r of the corner to determine an amount of override K (%), which is then delivered to a next stage. More specifically, the override arithmetic unit 103b carries out the following arithmetic operation if r < S:

$$K = n \cdot a \quad (4)$$

or the following arithmetic operation if S < r < m·T:

$$K = (100 - n \cdot a)\left(\frac{r - S}{m \cdot T - S}\right) + n \cdot a \quad (5)$$

or the followng arithmetic operation if m·T ≦ r:

$$K = 100 \quad (6)$$

to determine the amount of override K (%) and deliver the same to the relative speed arithmetic unit 103f. The values S, T and a are experimentally determined and stored in a register (not shown). Consequently, the amount of override K (%) varies with the radius of curvature r of the corner as indicated by the solid-line curve in FIG. 8. The larger the radius of curvature r of the corner, the more rectilinear the shape of the corner becomes and hence the less blunt the corner shape becomes upon flexing of the wire electrode. Stated otherwise, as the radius of curvature of the corner becomes larger, the bluntness of the corner becomes smaller, and the amount of override K (%) may be increased to cause the relative speed of movement between the workpiece and the wire electrode to approach the commanded feeding speed. As the corner angle $\theta$ becomes larger, the K−r characteristic tends to follow the dotted-line curve in FIG. 8, and as the corner angle becomes smaller, the K−r characteristic tends to follow the dot-and-dash-line curve in FIG. 8. This is because the larger the corner angle $\theta$, the more closely the corner shape is assumed and the less blunt the cut shape becomes upon flexing of the wire electrode. Therefore, as the corner angle $\theta$ becomes greater, the bluntness of the corner shape is reduced and the amount of the override K (%) can be increased to let the relative speed of movement between the workpiece and the wire electrode approach the commanded feeding speed.

With the amount of override K (%) determined, the relative speed arithmetic unit 103f effects the arithmetic operation of the equation (1) to determine the speed of relative movement F between the workpiece and the wire electrode for generating the pulse train CP of the relative speed F.

Simultaneously with the above process for determining the relative speed F, the processing unit 103g uses the numerical data X and Y to determine increments $\Delta X$ and $\Delta Y$, and supplies the latter to the pulse distributors 105X and 105Y and at the same time calculates $1/\sqrt{\Delta X^2 + \Delta Y^2}$ which is input to the frequency divider 103h. The frequency divider 103h frequency-divides the pulse train CP of the relative speed F supplied from the relative speed arithmetic unit 103f into pulses having a frequency of $F/\sqrt{\Delta X^2 + \Delta Y^2}$ which are then fed to adders (not shown) contained in the pulse distributors 105X and 105Y. The pulse distributors 105X and 105Y effect an arithmetic operation for pulse distribution to supply distributed pulses Xp and Yp to the servo circuits SVX and SVY for driving the X-axis and Y-axis motors MX and MY to move the wire electrode with respect to the workpiece. The distributed pulses Xp and Yp are also supplied to the processing unit 103g in which the arithmetic operation of the equation (2) is performed each time the distributed pulses Xp and Yp are delivered. When the remaining amounts of movement become zero, the processing unit 103g internally produces a pulse-distribution completion signal DEN to stop generation of the pulse train CP, and at the same time enables the tape reader 102 to read NC data for a next block to be cut from the paper tape 101. The speeds $F_x$ and $F_y$ of the distributed pulses Xp and Yp generated from the pulse distributors 105X and 105Y are given by the equations (3). The combined speed (which is a speed of movement of the table) is expressed by $\sqrt{F_x^2 + F_y^2}$ F which is exactly the same as the relative speed as calculated by the relative speed arithmetic unit 103f.

With the present invention as described above in detail, the degree of bluntness of the shape of a corner cut can be improved to a considerable degree without having to take the workpiece thickness t into consideration. Therefore, there is no need to consider the workpiece thickness t in the arithmetic operation to determine the relative speed of movement. While the equations (4)–(6) are used to find the amount of override K (%), they need not be relied on. Amounts of override dependent on radii r of the curvature of corners and corner angles $\theta$ may be stored in the form of tables in memories, and an amount of override K (%) corresponding to the actual radius r of curvature and corner angle $\theta$ may be read out of the memories.

Furthermore, various amounts of override which differ with the materials of workpieces and wire electrodes may be stored in the memories, and an appropriate amount of override may be determined according to the materials of a workpiece and a wire electrode as well as the corner angle and the radius of curvature of the corner.

With the present invention as described above, the relative speed of movement of the workpiece and the wire electrode at a corner to be cut is rendered moderately lower than the commanded speed so that the frequency of electric discharges at the corner can be reduced to lower the electric discharge pressure and thereby minimize the amount of flexing of the wire electrode. Since the corner is cut with the wire electrode which flexes to a small degree, the corner can be cut accurately along a commanded cutting path. Even if the same commanded speed is selected for a cutting operation along a straight line and a corner, an appropriate corner cutting speed can automatically be determined.

What is claimed is:

1. A method of controlling a wire-cut electric discharge machine, operatively connected to receive radius of curvature data, corner angle data, thickness data of the workpiece, and a commanded feeding speed which comprise cutting command data, by applying a voltage between a wire electrode and an electrically conductive workpiece for cutting the electrically conductive workpiece to a predetermined shape with electric discharge energy while the wire electrode and the workpiece are being moved relative to each other based on the cutting command data to cut the workpiece to the predetermined shape, said method comprising the steps of:

(a) determining an amount of override, which is the amount the commanded feeding speed is adjusted in dependence upon the radius of curvature data of the corner of the workpiece, the thickness data and the corner angle data;

(b) determining a relative feeding movement speed between the workpiece and the wire electrode, based on the radius of curvature data of the corner of the workpiece, corner angle data, the thickness data and the commanded feeding speed which comprise the cutting command data, and the amount of override, when cutting the corner; and (c) moving the workpiece and the wire electrode relative to each other at the relative feeding movement speed, which is lower than the commanded feeding speed, for electric discharge cutting of the corner.

2. A method of controlling a wire-cut electric discharge machine, operatively connected to receive radius of curvature data, corner angle data, workpiece thickness data, and a commanded feeding speed, which comprise cutting command data, by applying a voltage between a wire electrode and an electrically conductive workpiece for cutting the electrically conductive workpiece to a predetermined shape with electric discharge energy while the wire electrode and the workpiece are being moved relative to each other based on the cutting command data to cut the workpiece to the predetermined shape, said method comprising the steps of:

(a) determining an amount of override, which is the amount that the commanded feeding speed is adjusted, in dependence upon the radius of curvature data of the corner of the workpiece, the thickness data of the workpiece, and the corner angle data;

(b) determining a relative feeding movement speed between the workpiece and the wire electrode, based on the cutting command data and the amount of override, when cutting the corner; and (c) moving the workpiece and the wire electrode relative to each other at the relative feeding movement speed, which is lower than the commanded feeding speed, for electric discharge cutting of the corner.

3. A method of controlling a wire-cut electric discharge machine, operatively connected to receive radius of curvature data, corner angle data, workpiece thickness data and a commanded feeding speed, which comprise cutting command data, by applying a voltage between a wire electrode and an electrically conductivee workpiece for cutting the electrically conductive workpiece to a predetermined shape with electric discharge energy while the wire electrode and the workpiece are moved relative to each other based on the cutting command data, to cut the workpiece to a predetermined shape, said method comprising the steps of:

(a) determining and storing an amount of override, which is the amount the commanded feeding speed is adjusted, in dependence upon the radius of curvature data, the corner angle data, and the workpiece thickness data;

(b) determining the relative feeding movement speed between the workpiece and the wire electrode, based on the the cutting command data and the amount of override, when cutting the corner; and (c) moving the workpiece and the wire electrode relative to each other at the relative feeding movement speed, which is lower than the commanded feeding speed, for electric discharge cutting of the corner.

* * * * *

UNITED STATES PATENT AND TRADEMARK OFFICE
CERTIFICATE OF CORRECTION

PATENT NO. : 4,523,073
DATED : JUNE 11, 1985
INVENTOR(S) : GOTARO GAMO ET AL.

It is certified that error appears in the above-identified patent and that said Letters Patent is hereby corrected as shown below:

Col. 1, line 34, "directions" should be --directions,--;
line 36, "$RL_2$" should be --$RL_2$,--;
line 46, delete "of" (first occurrence).

Col. 2, line 17, "fixing" should be --flexing--.

Col. 3, line 43, "of" (first occurrence) should be --on--;
"on" should be --of--.

Col. 4, line 16, "and," should be --and--;
line 40, "F," should be --=F,--;
line 59, "The n" should be --The parameters n--.

Col. 5, line 24, "a" should be --$\underline{a}$--;

line 65, "$F/\sqrt{\Delta X^2 + \Delta Y^2}$" should be

--$F/\sqrt{\Delta X^2 + \Delta Y^2}$--.

Col. 6, line 18, "$\sqrt{F_X^2 + F_Y^2}F$" should be --$\sqrt{F_X^2 + F_Y^2} = F$--.

Signed and Sealed this

Fifteenth Day of October 1985

[SEAL]

Attest:

DONALD J. QUIGG

Attesting Officer

Commissioner of Patents and
Trademarks—Designate